United States Patent [19]

Spallone et al.

[11] Patent Number: 4,959,686

[45] Date of Patent: Sep. 25, 1990

[54] AUTOMATED SHOPPING ORDER ENTRY SYSTEM

[75] Inventors: John J. Spallone, New Milford; William E. Doyle, Monroe; Peter Cawley, Waterbury, all of Conn.

[73] Assignee: Dexter Systems, Inc., New Milford, Conn.

[21] Appl. No.: 159,758

[22] Filed: Feb. 24, 1988

[51] Int. Cl.[5] .............................................. G06F 15/21
[52] U.S. Cl. ................................ 364/401; 340/309.15
[58] Field of Search ............... 364/400, 401, 405, 407; 340/309.15

[56] References Cited

U.S. PATENT DOCUMENTS

| | | | |
|---|---|---|---|
| 4,073,368 | 2/1978 | Mustapick | 358/93 |
| 4,388,689 | 6/1983 | Hayman et al. | 364/401 |
| 4,398,257 | 8/1983 | Paganini et al. | 364/550 |
| 4,547,851 | 10/1985 | Kurland | 364/401 |
| 4,575,707 | 3/1986 | Imazeki et al. | 340/309.15 |
| 4,722,053 | 1/1988 | Dubno et al. | 364/401 |
| 4,788,715 | 11/1988 | Lee | 379/84 |

FOREIGN PATENT DOCUMENTS

| | | | |
|---|---|---|---|
| 0127662 | 10/1980 | Japan | 364/405 |
| 0225482 | 12/1984 | Japan | 364/405 |
| 0225483 | 12/1984 | Japan | 364/405 |
| 0225484 | 12/1984 | Japan | 364/405 |

OTHER PUBLICATIONS

Pat. Abs. of Jap., Imazeki, Abs. No. 58-166284, vol. 8, No. 1 (P246).
Pat. Abs. of Jap., Ato, Abs. No. 61-220062, vol. 11, No. 56 (P549).
Pat. Abs. of Jap., Shogetsu, Abs. No. 62-37769, vol. 11, No. 219 (P596).
Pat. Abs. of Jap., Suzuri, Abs. No. 62-79567, vol. 11, No. 283 (P615).

Primary Examiner—Jerry Smith
Assistant Examiner—David Huntley
Attorney, Agent, or Firm—Martin M. Novack

[57] ABSTRACT

An automated shopping order entry system has particularly advantageous features for use in a supermarket having a delicatessen station. A processor subsystem, a customer subsystem, and an employee subsystem are provided. The customer subsystem can be located in the view of customers entering at a customer entrance that is typically remote from the delicatessen station. The customer can select delicatessen items and gets a printout of item selection and of estimated waiting time based on an accumulated variable workload that depends on items ordered by customers. Shopping efficiency is increased by making automated shopping available to the customer at an advantageous place and time in the shopping pattern, and by handling waiting time in an advantageous manner.

8 Claims, 14 Drawing Sheets

[ADVERTISEMENT]

TO START →
PRESS E

3B

SELECT A CATEGORY
- MEAT
- CHEESE
- SALAD
- HOT FOOD
- SEAFOOD

3C

SELECT AN ITEM

1:- AMERICAN CHEESE
2:- SWISS CHEESE
3:- PROVOLONE
4:- MOZZERELLA
5:- LOL CHEESE

3D

HOW MUCH WOULD YOU LIKE?
- 1/4 LB
- 1/2 LB
- 1 LB
- 1/2 LB
- 2 LB

3E

WOULD YOU LIKE MORE ITEMS   YES / NO

ORDER DISPLAYED HERE
1/2 LB. AMER. CHEESE
1/2 LB. BALOGNA

3F

PRESS YES TO SEND YOUR ORDER TO THE DELI

PRESS NO TO CANCEL

YES / NO

3G

YOUR ORDER IS BEING PRINTED....

```
    1/2 LB BOILD HAM           $ 2.39
    1/2 LB. AMERICAN CHEESE    $ 1.15
    1 LB   POTATO SALAD        $ 1.35
                               ______
                    TOTAL      $ 4.89

TIME OF ORDER    2:35 PM

YOUR ORDER WILL BE
    READY IN :  12 MINUTES
```

AUTOMATED SHOPPING ORDER ENTRY SYSTEM

BACKGROUND OF THE INVENTION

This invention relates to automatic shopping assistance systems and, more particularly, to an automated system for entering shopping orders.

In recent years, various computer-based systems have been devised for automating parts of the shopping process. Employee-operated systems for processing orders have become almost commonplace in restaurants, department stores, etc. Typically, a shopper or customer will give an order to an employee who will enter the information into a data terminal. Systems wherein a customer directly inputs the information to a data terminal have also gained acceptance for certain applications, automated bank teller equipment being perhaps the most prevalent. Systems have also been suggested for having restaurant customers enter their orders directly at a data terminal by selecting from menus displayed on a monitor.

It is one of the objects of the present invention to improve on existing system of direct order entry by a customer. It is among the further objects of the invention to provide a direct customer order entry system, which facilitates interaction with employees filling the order. It is also among the further objects of the invention to provide an improved customer order entry system which is particularly advantageous for use in a shopping setting, such as a supermarket delicatessen, wherein the customer can be occupied with other shopping while the customer-entered order is being processed.

SUMMARY OF THE INVENTION

Among the advantages of an embodiment of the present invention is the efficiency which results from the system as used in a shopping environment where a customer who places an order has other nearby shopping to do. A prime example is a supermarket having a delicatessen station. Often, a customer must wait on line for her or his order to be taken, and then wait some more while the order is being prepared. In addition to wasting the customer's time, these waiting times prove costly to the selling establishment in the long run. First of all, customers who see a waiting line or who know there is generally a waiting line at the delicatessen counter, may bypass delicatessen shopping. Since delicatessen food is among the most profitable categories of food sold in a supermarket, this has an adverse effect on profitability. Also, when a customer spends substantial waiting time at the delicatessen counter, he or she my be losing other shopping time in the store. As will be described, features of the present invention are directed to increasing the efficiency of shopping by making automated shopping available to the customer at an advantageous place and time in the shopping patterns, and by handling waiting time in a manner that is particularly attractive to shoppers.

In accordance with one form of the present invention, which is utilized in a supermarket having a customer entrance and a delicatessen station remote from the customer entrance, a system is provided for automated delicatessen shopping. A processor subsystem is provided and includes: means for storing data describing delicatessen items available for purchase; means for controlling a sequence for shopping item data presentation, so that a shopper can be led through the procedure of automated item selection; and means for storing data representative of a customer's item selections. A customer subsystem is provided, and is located in view of customers entering at the customer entrance. The customer subsystem is coupled with processor subsystem and includes: a display for presenting the available items for customer selection; customer input means, such as a keyboard, for indicating customer item selections; and customer printer means for printing a customer copy of customer item selections. An employee subsystem is also provided, and is located at the delicatessen station. The employee subsystem is also coupled with the processor subsystem, and includes employee printer means for printing an employee copy of customer item selections. Preferably, the employee subsystem will also include a display and an input keyboard, as will be described further hereinbelow. In the described form of the invention, a customer entering the supermarket can conveniently order delicatessen items upon entering, and the customer order can be processed by an employee as the customer shops and progress toward the delicatessen station.

As described further hereinbelow, in the present invention one or more customer terminals can be provided, a preferred configuration having at least two customer terminals, with one at the supermarket entrance and another at the delicatessen station itself.

A further form of the invention has application to automated shopping in general. This form of the invention is also particularly advantageous for delicatessen ordering in a supermarket environment, but can be applied to other types of automated shopping particularly where the customer can make good use of the time during which an order is being prepared, such as by doing other shopping during such waiting time. In accordance with a feature of this form of the invention, means are provided for storing an estimated waiting time, the waiting time being a predetermined value, or input by an employee, or automatically computed, as will be described further hereinbelow. When a customer receives a printout of her/his order, the estimated waiting time is indicated on the printout, and permits the customer to efficiently time the pickup of the order at the delicatessen station (or other suitably designated place) at or after the designated time. In an embodiment of the invention, the waiting time is variable, and is generated as a function of the workload at the delicatessen station.

Further features and advantages of the invention will become more readily apparent from the following detailed description when taken in conjunction with the accompanying drawings.

BRIEF DESCRIPTION OF THE DRAWINGS

FIG. 3 which consists of FIGS. 3A through 3G, illustrates a sequence of customer prompting and selection menus as utilized in an embodiment of present invention.

DESCRIPTION OF THE PREFERRED EMBODIMENT

Figure 1:
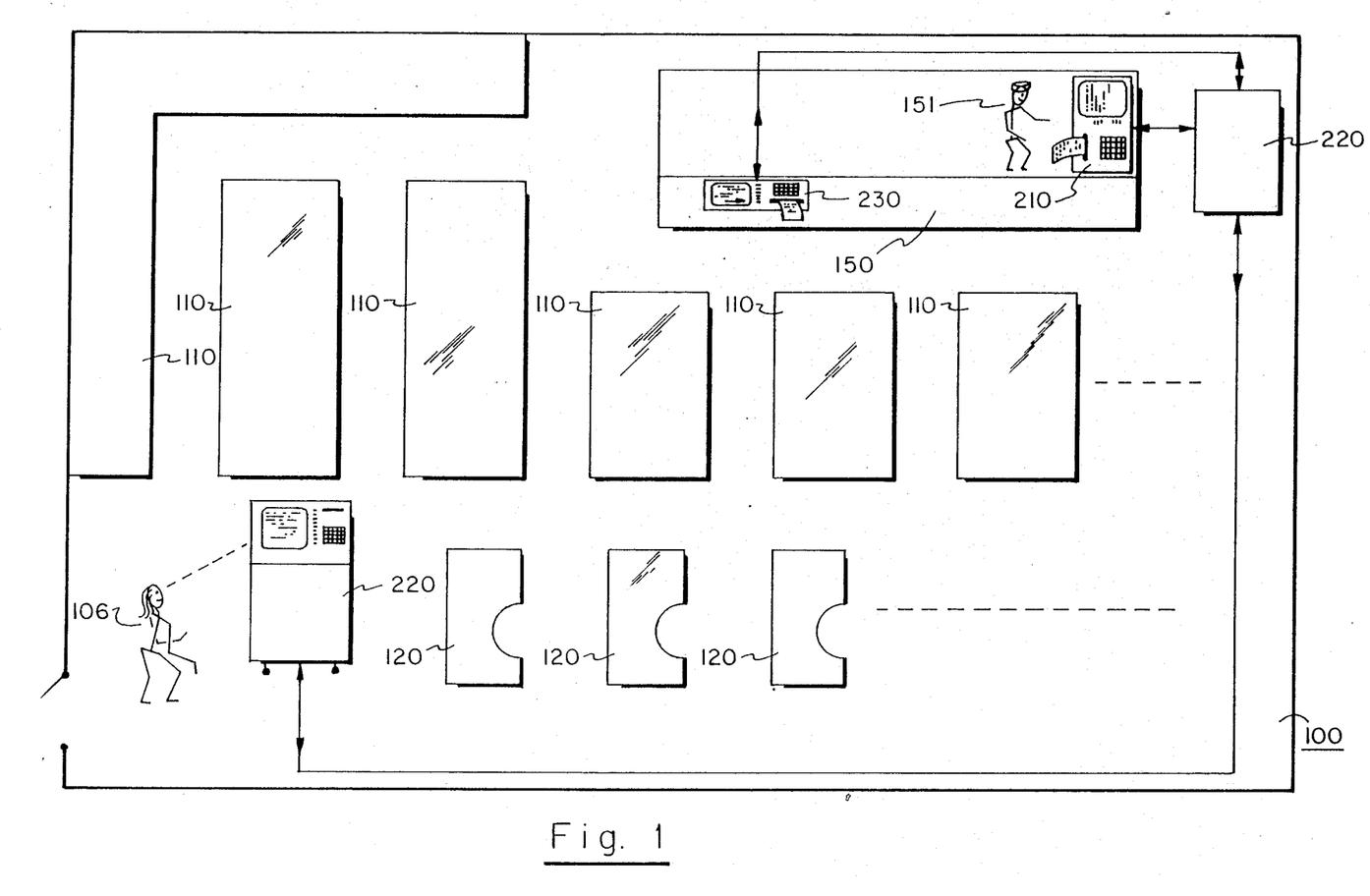
FIG. 1 is a plan diagram, partially in schematic form, of a supermarket with a delicatessen station and an embodiment of a system for automated delicatessen shopping in accordance, with the invention.

Referring to FIG. 1, there is shown a diagram which illustrates an embodiment of the present invention. A supermarket 100 has the usual multiple rows of self-service shelves 110 and checkout counters 120. The supermarket has a customer entrance 105, and also has a delicatessen station 150, where employees e.g. 151 respond to verbal request of customers (shoppers) for items such as prepared salads, sliced cold cuts, etc. Typically, although not necessarily, the delicatessen station is remote from the supermarket entrance, as shown in FIG. 1.

In the usual supermarket delicatessen arrangement, there are two waiting time components which contribute to overall customer waiting time; namely, the time spent waiting in any line that has formed of customers waiting for service at the delicatessen station, and the time required to fill an order after it has been verbalized to a delicatessen employee. As above noted, waiting time for delicatessen service can tend to cause supermarket shoppers to omit delicatessen shopping they may have done but for the wait. Also, for those shoppers who do elect to bear the wait, other shopping time maybe lost. In both cases, overall supermarket profitability will be reduced.

Another factor to be considered is the location of the supermarket delicatessen station which, as stated, is typically remote from the supermarket entrance. In a typical shopping pattern, by the time a customer reaches the delicatessen station she/he has already done some shopping from the shelves, an activity which involves no waiting. If, upon arrival at the delicatessen station, even a small wait is apparent, the customer may not be willing to break the "rhythm" of shopping. This can result in customers doing less delicatessen shopping than they actually wanted to, and loss of delicatessen sales.

In accordance with one of the features of a form of the present invention, a customer subsystem (terminal) 220 is located in the view of customers (e.g. 106) entering the supermarket at the customer entrance, so that a customer can conveniently order delicatessen items upon entering the supermarket, and the customer order can be processed by an employee as the customer shops and progresses toward the delicatessen station.

Figure 2:
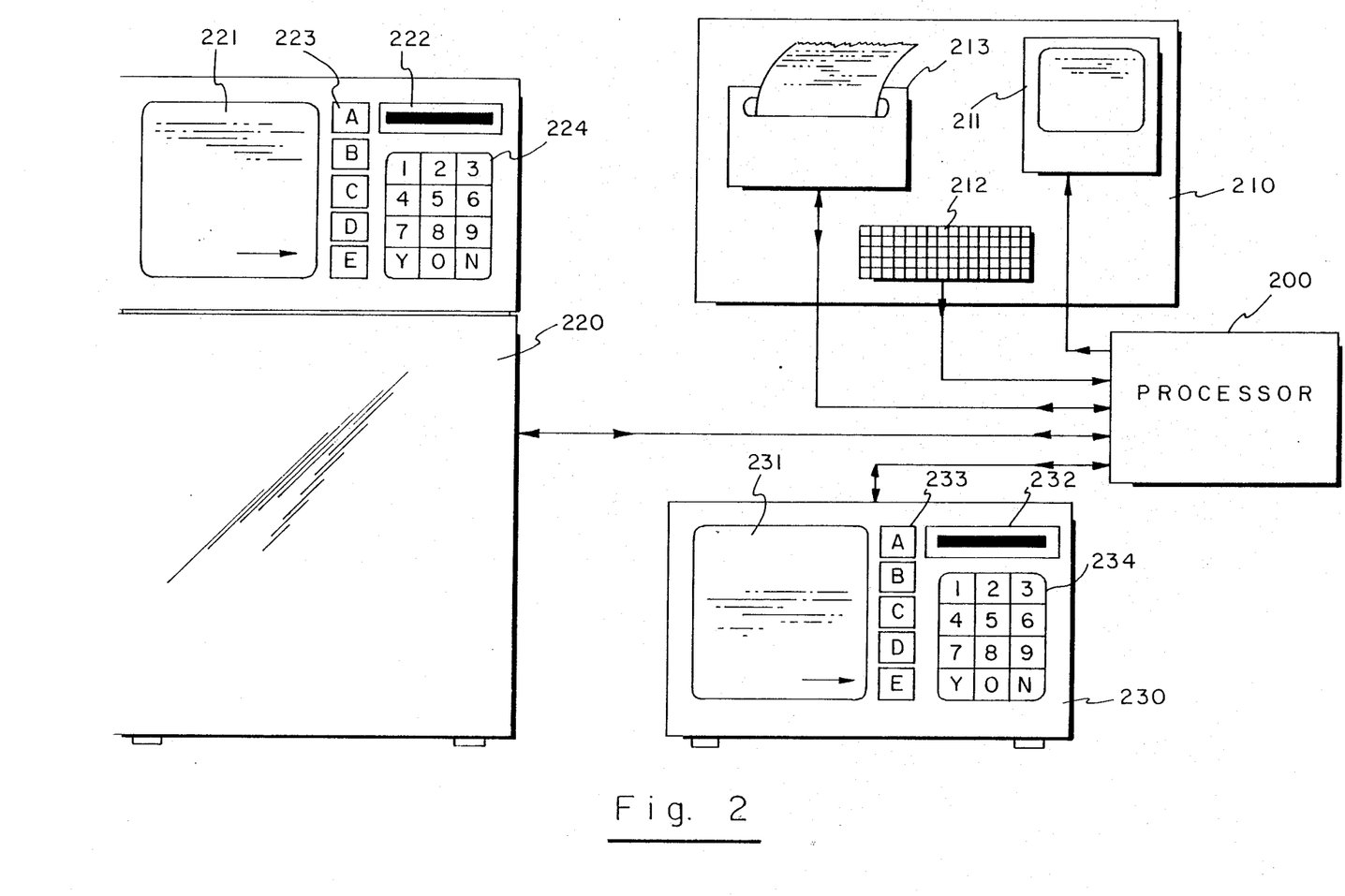
FIG. 2 is a schematic diagram, particularly in block form, of the processor subsystem and the employee and customer subsystems of the FIG. 1 embodiment.

In the embodiment of FIG. 1, the automated delicatessen shopping system includes a processor 200, an employee terminal 210 adjacent the processor, a first customer terminal 220 located near the supermarket entrance, and a second customer terminal 230 located at or near the delicatessen counter (see also FIG. 2). Each of the terminals in the present embodiment includes a keyboard, a monitor, and a printer. The processor 200 may be, for example, an IBM XT or AT computer or an IBM-compatible computer, equipped with a suitable memory and disc operating system.

FIG. 2 shows the processor and terminals of the present embodiment in further detail. The employee terminal includes a monitor 211, a keyboard 212, and a printer 213. The customer terminal 230 in the present embodiment is a countertop unit containing a monitor 231, a printer 232, and keypads 233 and 234. The keypad 233 had buttons with letters A through E, and the keypad 234 is a numerical keypad with numerals 0 through 9 and "yes" and "no" keys. The customer terminal 220, which is situated near the supermarket entrance 105, is a free-standing console in the present embodiment, and includes a monitor 221, a printer 222, and keypads 223 and 224, which are similar to their counterparts in customer terminal 230. It will be understood that at least one processor (200 in the present embodiment) is needed, but that more than one can be employed if desired. Also, the location(s) of the processor(s) used is a matter of choice.

Figure 3A:
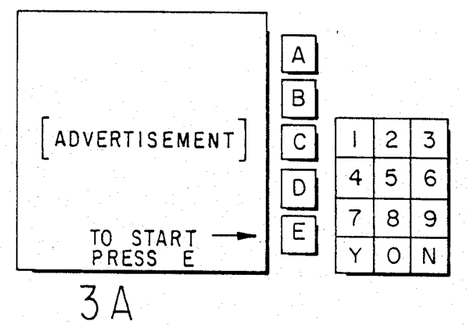
Figure 3B:
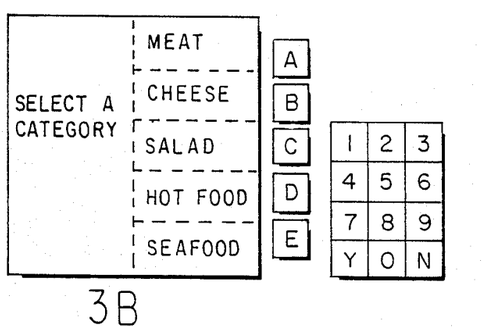
Figure 3C:
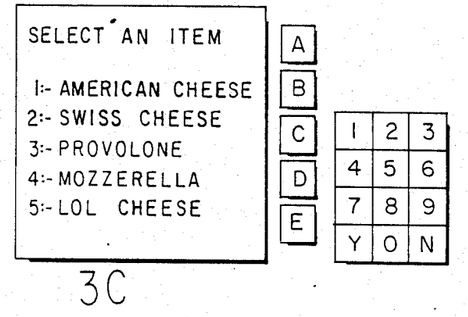

FIG. 3 illustrates a sequence of screen displays on a customer terminal monitor that are utilized to guide a customer through the process of automated order entry. Briefly, 3A shows the "Start" screen, with an advertisement and a prompt to start by pressing key E; 3B shows the screen which prompts selection of a "Category"; 3C shows the screen which prompts "Item Selection"; 3D shows the screen which prompts "Amount Selection"; 3E shows the screen which prompts a decision for ordering more items; 3F shows the screen for confirming the order; and 3G shows the screen which advises that the order is being printed. FIG. 4 shows an example of a printout from the customer terminal. The FIGS. 3 and 4 are referred to further hereinbelow in conjunction with the description of the flow diagrams of FIGS. 6–13.

Figure 5:
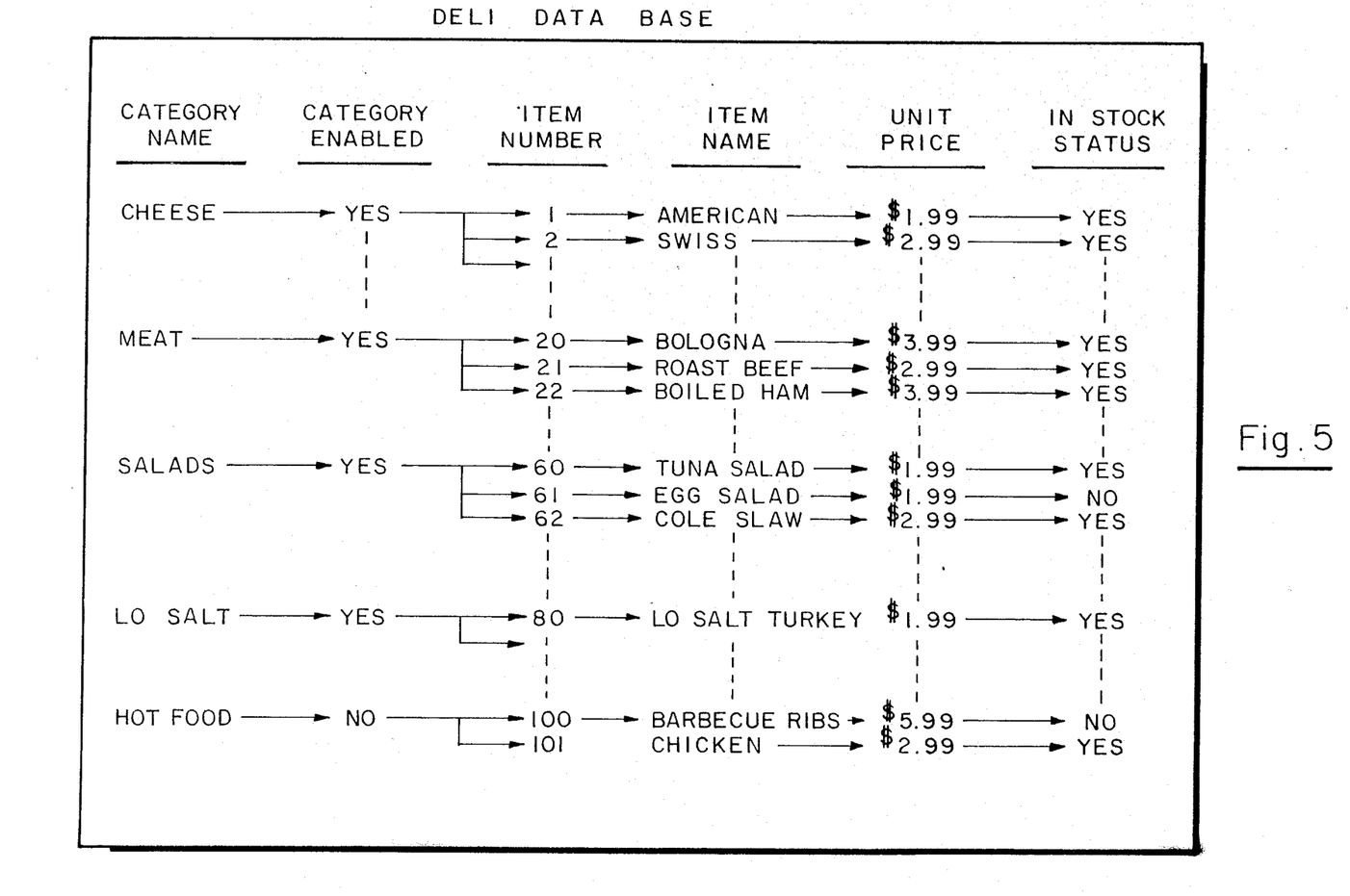
FIG. 5 illustrates the type of shopping item data base used in the present embodiment.
Figure 6:
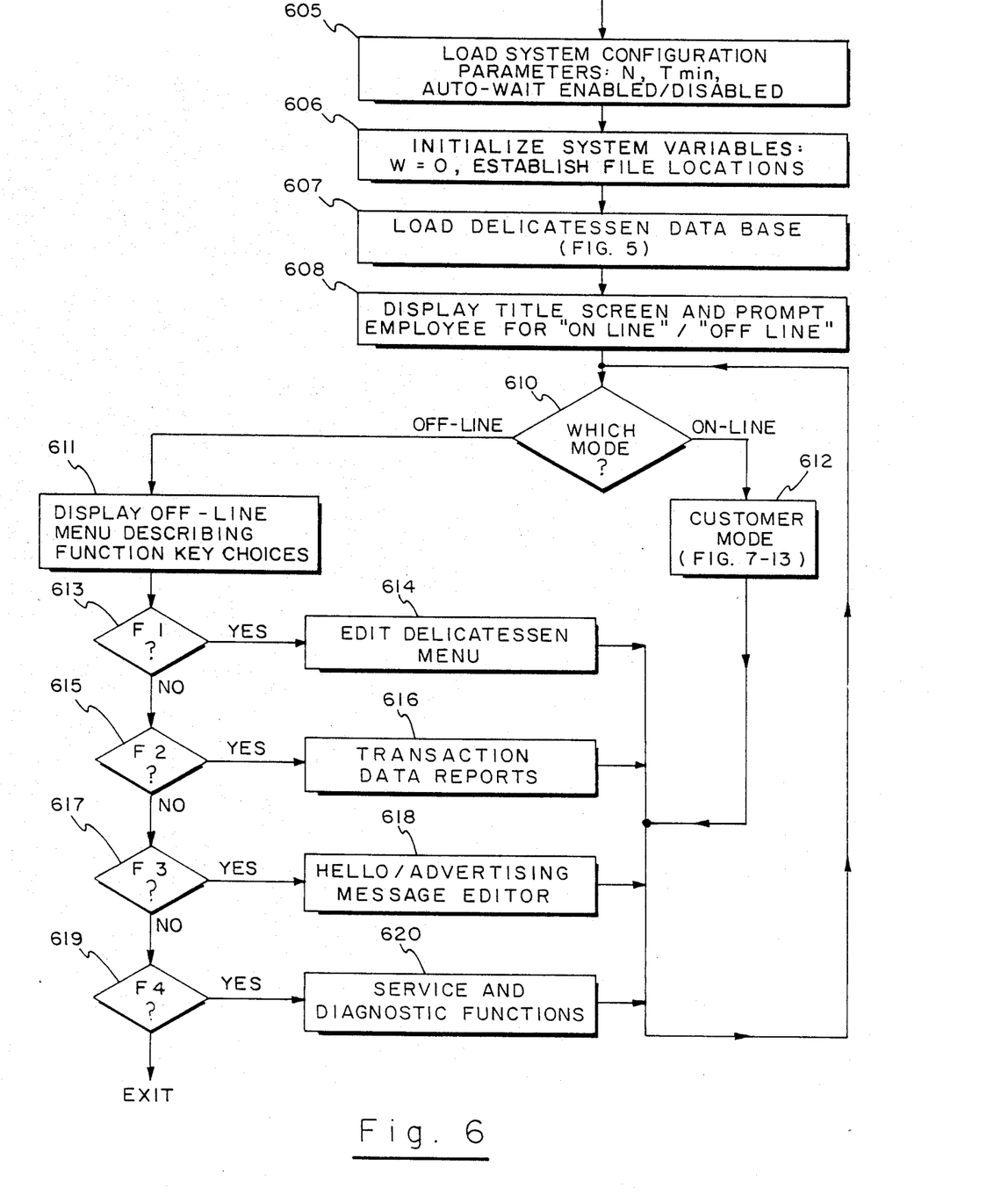
FIGS. 6–13 are flow diagrams of a routine for programming the processor to implement operation in accordance with an embodiment of the invented system.

Referring to FIG. 6, there is shown a flow diagram of the initial portion of the routine for programming the processor 200 to implement operation in accordance with the present embodiment of the invention. The block 605 represents the loading of system configuration parameters, such as the possible number of customer terminals, N, the minimum estimated customer wait time to be used, $T_{min}$, and an indication of whether the automatic customer wait time feature is initially enabled or disabled. The block 606 is then entered, this block representing the initialization of system variables. For example, the workload, W, is initialized at 0, and file locations are established to store transactions (e.g. customer orders). A predetermined delicatessen data base can then be loaded (block 607) typically by downloading from disk storage, as represented by the block 607. The data base can have any suitable format, the type of format being utilized in the present embodiment being illustrated in FIG. 5, wherein data is organized by category name (e.g. salad, meat, cheese, etc.), an indication of whether the category is enabled, item number (there being a unique item number for each delicatessen item), item name (there typically being a number of items in each category), the unit price for each item, and the "in stock" status of each item. It will be understood that data bases for compiling, storing, and editing information in this general type of format are well known in the art.

The block 608 is next entered, this block representing the display of a title screen, and a prompt to an employee to press a function key to select a desired mode of the system. First, as represented by decision diamond 610, determination is made as to whether the system will be placed in the "on line" mode (i.e., a "customer mode" in which customers can enter orders from the customer terminal or terminals) or one of a number of "off line" modes, in which the system can be altered or checked. The selection of the "on-line" customer mode is represented by the block 612, the functioning of which is described in detail in conjunction with the flow diagrams of FIGS. 7–13. The "off line" modes are indicated as being selected using particular function keys (as prompted to the employee - see block 611) to obtain states used for editing the delicatessen menu (diamond 613 and block 614), generating transaction data reports (diamond 615 and block 616), editing the "hello/advertising message" that can be displayed on the customer terminals (diamond 617 and block 618), and servicing and diagnostic functions (diamond 619 and block 620). Programs for editing data bases, generating reports from data bases, editing a display screen, and diagnosing equipment are all well known in the art and do not, per se, constitute inventive features hereof, and are not described in detail.

Figure 7A:
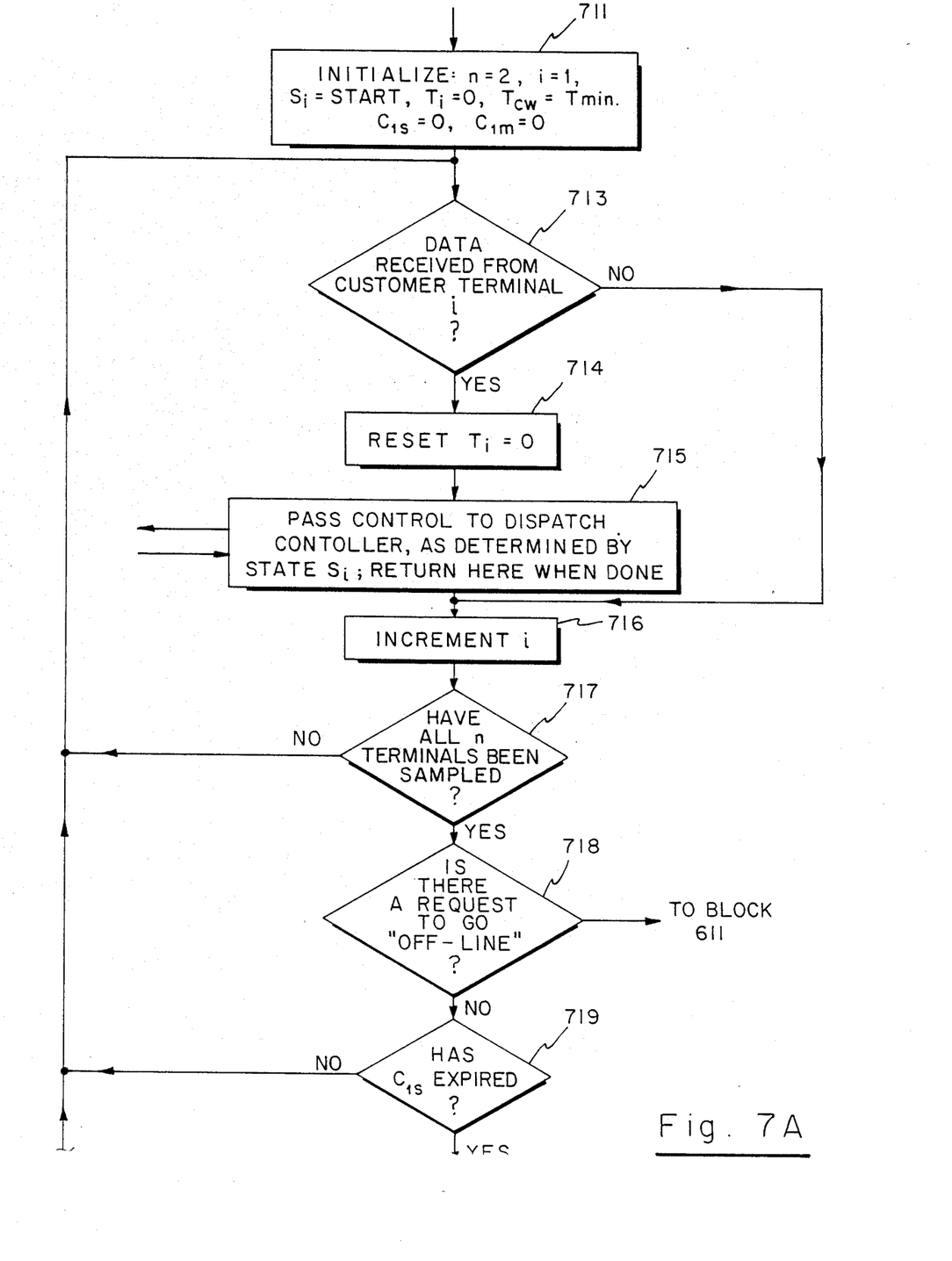
Figure 7B:
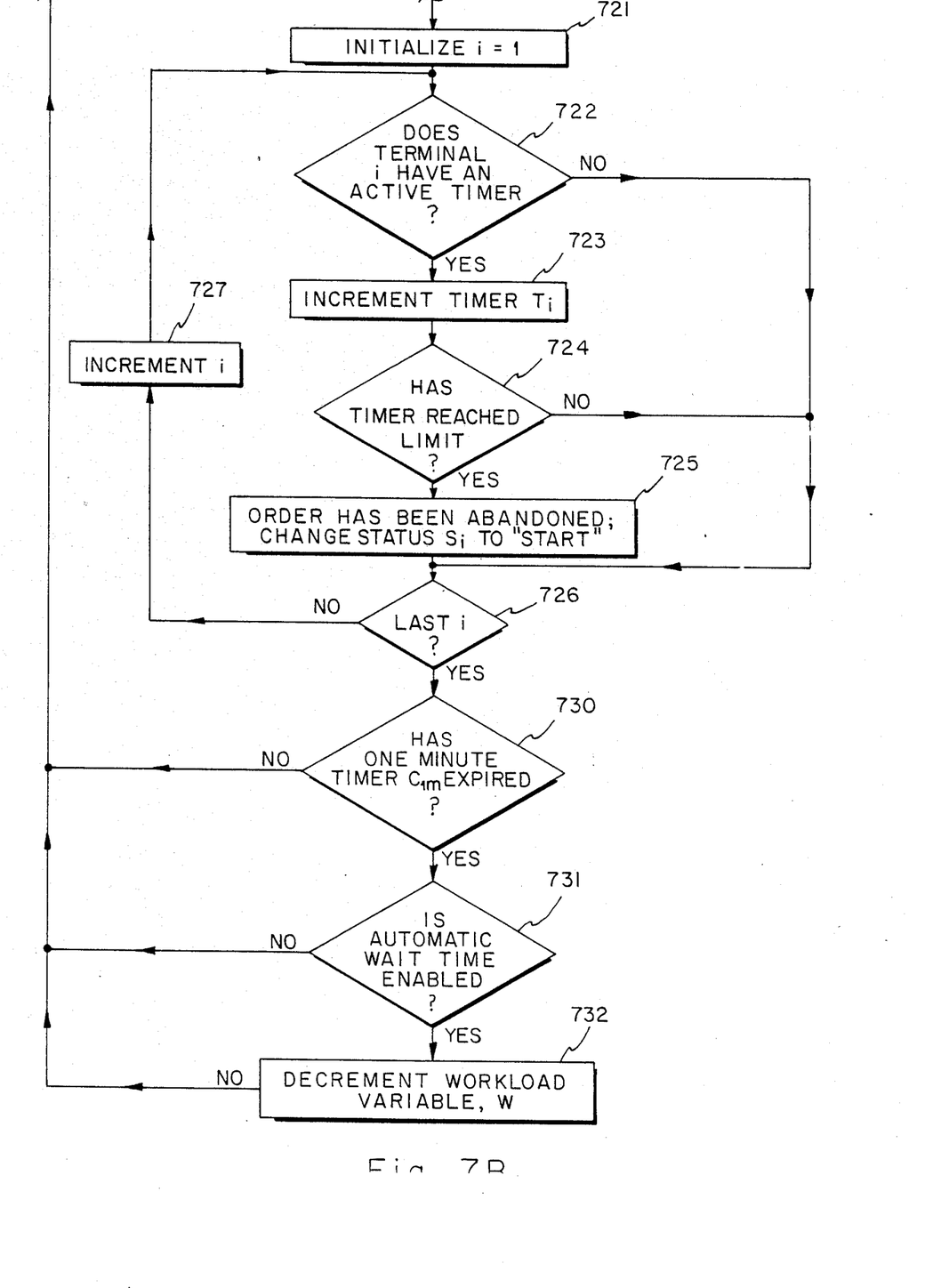

Referring to FIG. 7 (which includes 7A and 7B) there is shown a flow diagram of the routine for the "on line" customer mode in accordance with an embodiment of the invention. The block 711 represents initialization of variables, for example: n is the number of customer terminals used (two in the present embodiment), i is the customer terminal under consideration, $S_i$ is the state of terminal i (which is set to "Start", and which results in display of the "Hello/Advertising" screen as shown in FIG. 7A), $T_i$ is a timer for terminal i, $T_{cw}$ is the customer wait time (which is initially set at a minimum value, $T_{min}=3$ minutes), and $C_{ls}$ and $C_{lm}$ are respectively one second and one minute timers (the purposes of which will be explained hereinbelow), which are initialized at 0. Inquiry is made (diamond 713) as to whether data has been received from customer terminal i. If not, the block 716 is entered directly, and i is incremented. If data has been received, the timer for customer terminal i, Ti, is reset to zero (block 714), and control is then passed (block 715) to a dispatch controller, which is operative to direct the program to an appropriate function, depending upon the state, $S_i$, of the terminal i from which the data has been received. These states, and the appropriate transfers, will be described further hereinbelow. The customer terminal index i is then incremented (block 716) and inquiry is made (diamond 717) as to whether all customer terminals have been interrogated. If not, diamond 713 is re-entered. If so, however, after checking to see if there has been a request to go "off line" (diamond 718), diamond 719 is entered, and inquiry is made as to whether the one second timer, $C_{ls}$, has expired. In the present embodiment, the one second timer is utilized for the purposes of stepping a one minute timer (to be discussed below), and for checking, after each second has elapsed, to see if a customer at any customer terminal may have abandoned an order in the middle of the ordering procedure. In such case, it will be desirable to have that terminal return to its "Start" state. A timer $T_i$ is provided for each customer terminal, and the timer is restarted each time a customer input is received from the terminal (see block 714 above). If a predetermined interval of time (e.g. 30 seconds) passes without a customer response, the customer is assumed to have abandoned the order. In the flow diagram, this is implemented by initializing the terminal index (block 721), and inquiring as to whether customer terminal i has an active timer (diamond 722). If so, the timer $T_i$ of customer terminal i is incremented (block 723), and inquiry is made as to whether the timer has reached its limit (diamond 724); viz., has the predetermined time, for example 30 seconds, expired since the customer last keyed in a command?. If so, the assumption is made that the customer has abandoned the order during an ordering sequence, and the status of terminal i is then changed to "Start" (block 725). Inquiry is then made (diamond 726) as to whether all terminals have been checked. If not, the customer terminal index i is incremented (block 727), and the diamond 722 is re-entered.

When all customer terminals have been checked, inquiry is made (diamond 730) as to whether the one minute timer, $C_{lm}$, has run out. The one minute timer is utilized in automatically reducing the workload variable, W. As will be discussed further, as time passes an existing workload will be increased by customer orders, and will naturally decrease, with time, as orders are filled. If the one minute timer has expired, inquiry is made (diamond 731) as to whether the "automatic wait time" feature is enabled (diamond 731). If so, the deli workload variable, W, is decremented, as represented by the block 732. The diamond 713 is then re-entered (it also being re-entered from the "no" decision branches of diamonds 719, 730 and 731) to await the next data from customer terminals.

Figure 8:
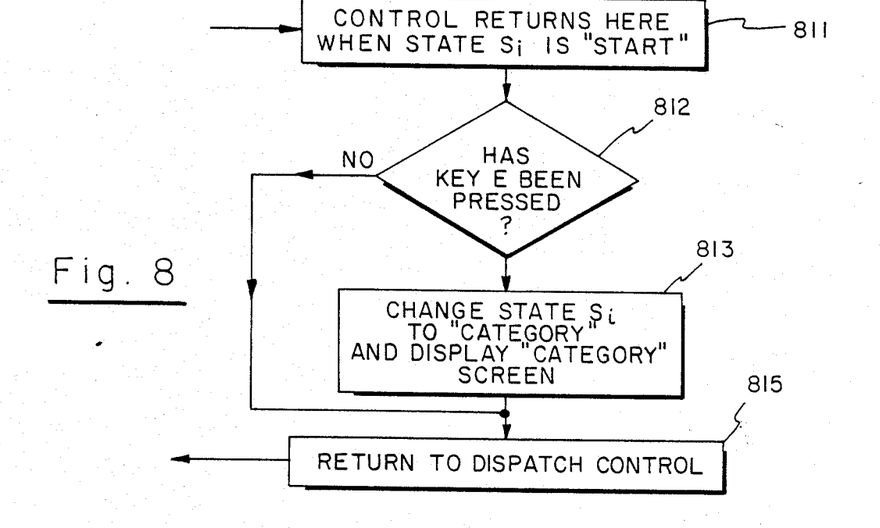

Referring to the flow diagram portion of FIG. 8, the block 811 represents the entry point to which the routine returns when customer data has been received at terminal i, and the state, $S_i$, of terminal i is "Start". Inquiry is made (diamond 812) as to whether the key "E" has been pressed; i.e., has the customer responded to the invitation on the screen as shown in FIG. 3A. If not, the block 815 is entered directly. If so, the state of customer terminal i, $S_i$, is changed to "Category" (block 813), and the "Category" screen is displayed on customer terminal i, as shown in FIG. 3B. The block 815 is then entered, this block representing the return to dispatch control of the routine.

Figure 9:
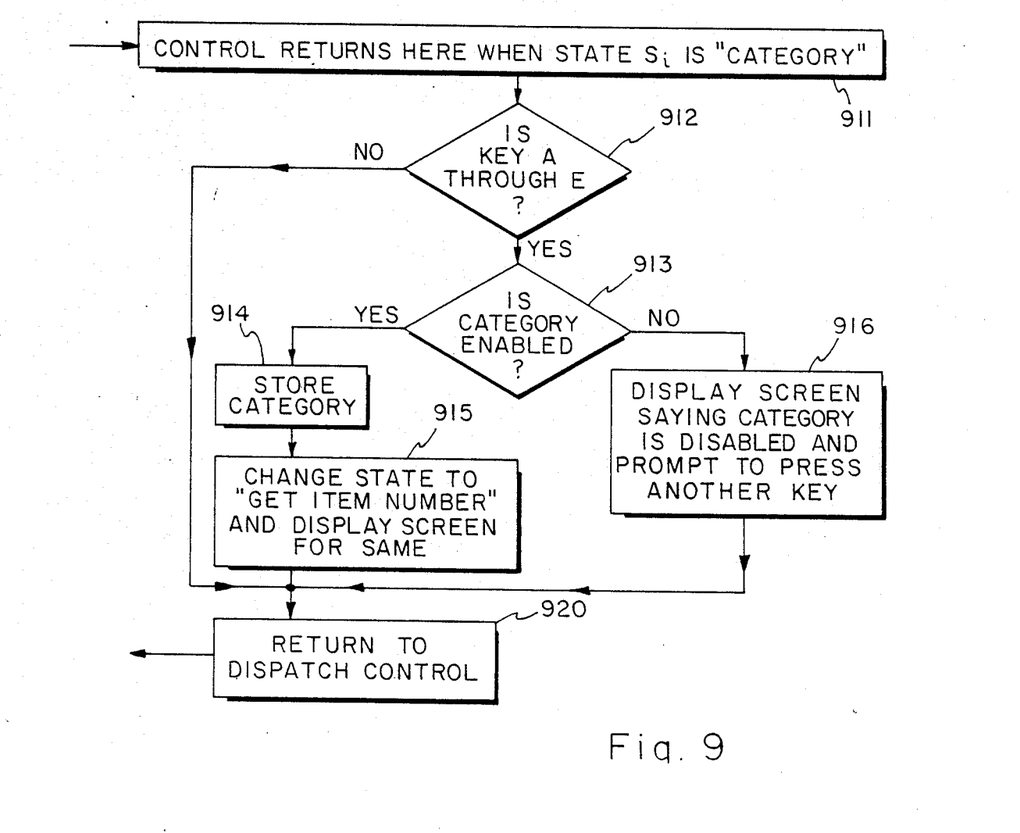

Referring to the flow diagram portion of FIG. 9, the block 911 represents the return point in the routine when customer terminal i is in the state "Category", and data is received from customer terminal i. Inquiry is made (diamond 912) as to whether the data is the key is A through E. If not, the block 920 is entered directly. If so, however, the customer has selected a valid category and an inquiry is made (diamond 913) as to whether the selected category is enabled. In the present embodiment, categories can be readily disabled by an employee so that, for example, during certain hours of the day, a particular category of items will not be sold. In the FIG. 3 sequence, if the category selected by the customer is not enabled, a screen is displayed (not shown) to inform the customer that the category is not available at this time, and prompt the customer to press another category key. If the customer-selected category is enabled, the category is stored (block 914). The state $S_i$ is changed to "Get Item Number" (block 915), and a screen is displayed that contains a list of the items in the selected Category, and their prices. In this regard, see FIG. 3C. The block 920 is then entered, this block representing the return to dispatch control.

Figure 10:
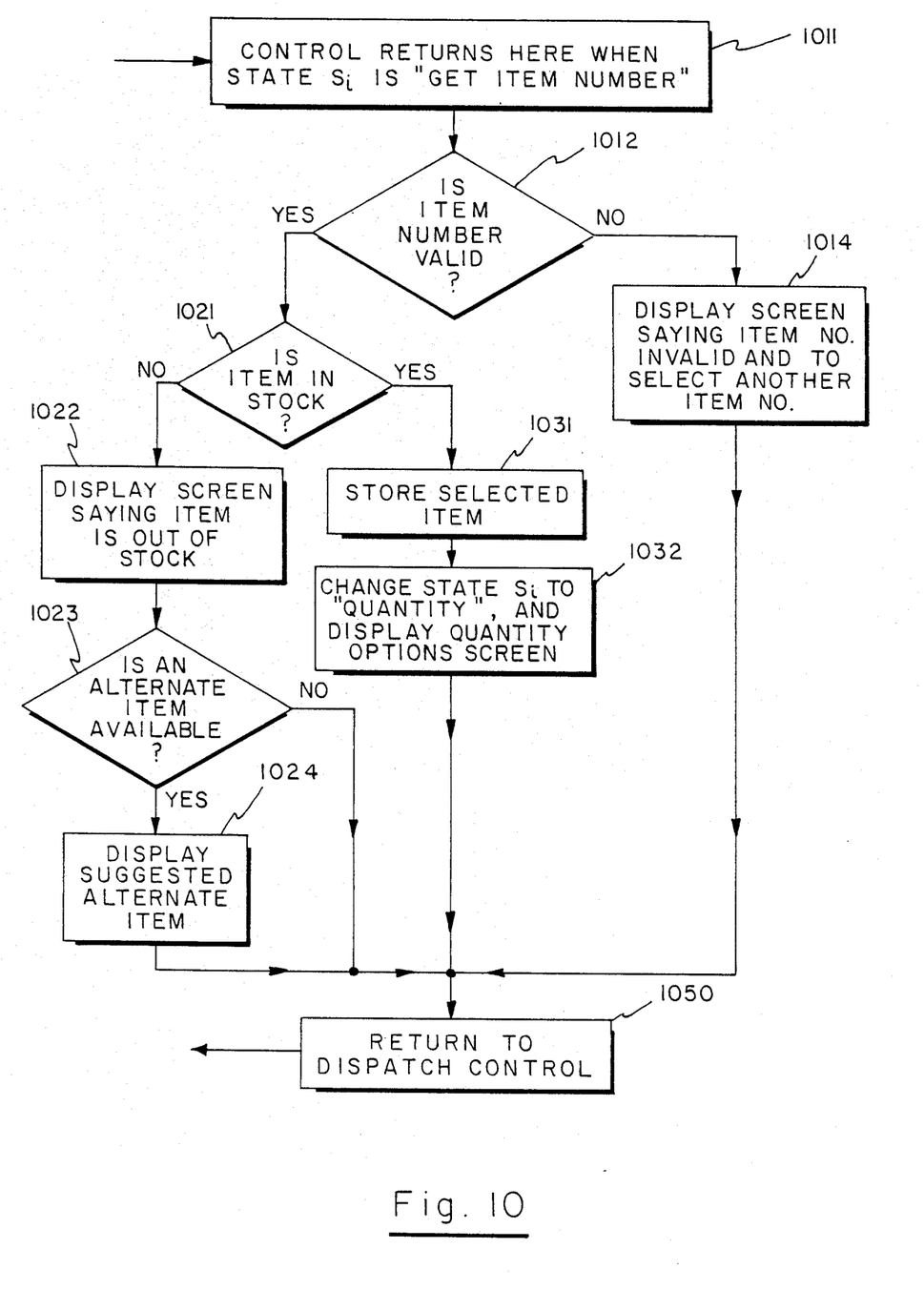

Referring to FIG. 10, there is shown a further portion of the routine of the present embodiment, in which the block 1011 represents the return point of the routine when the customer terminal i is in the state "Get Item Number", and data is received from customer terminal i. Determination is made (diamond 1012) as to whether the customer-selected item number is valid. If not, the block 1014 is entered, and a screen is displayed (not shown) to inform the customer that the selected item number is invalid, and that another item should be selected. The block 1050 is then entered. If the item number is valid, inquiry is made (diamond 1021) as to whether the item is in stock. [See the "in stock" status in the data base diagram of FIG. 5. The employee can readily change this status in the data base, as desired, with an edit.] If the item is out of stock, the block 1022 is entered, this block representing the display of a screen which informs the customer that the item is out of stock. If desired, and in accordance with an optional feature hereof, alternative items can be stored in the data base in conjunction with some or all of the items on the list. If this feature is used, inquiry is made (diamond 1023) as to whether an alternative item is available for suggestion and, if so, a display screen is presented (block 1024) suggesting the possible alternative item. In either case, the block 1050 is then entered.

Figure 3D:
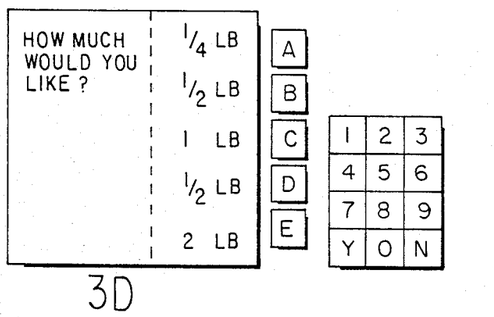
Figure 3E:
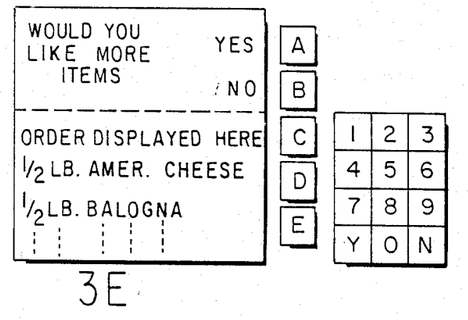
Figure 4:
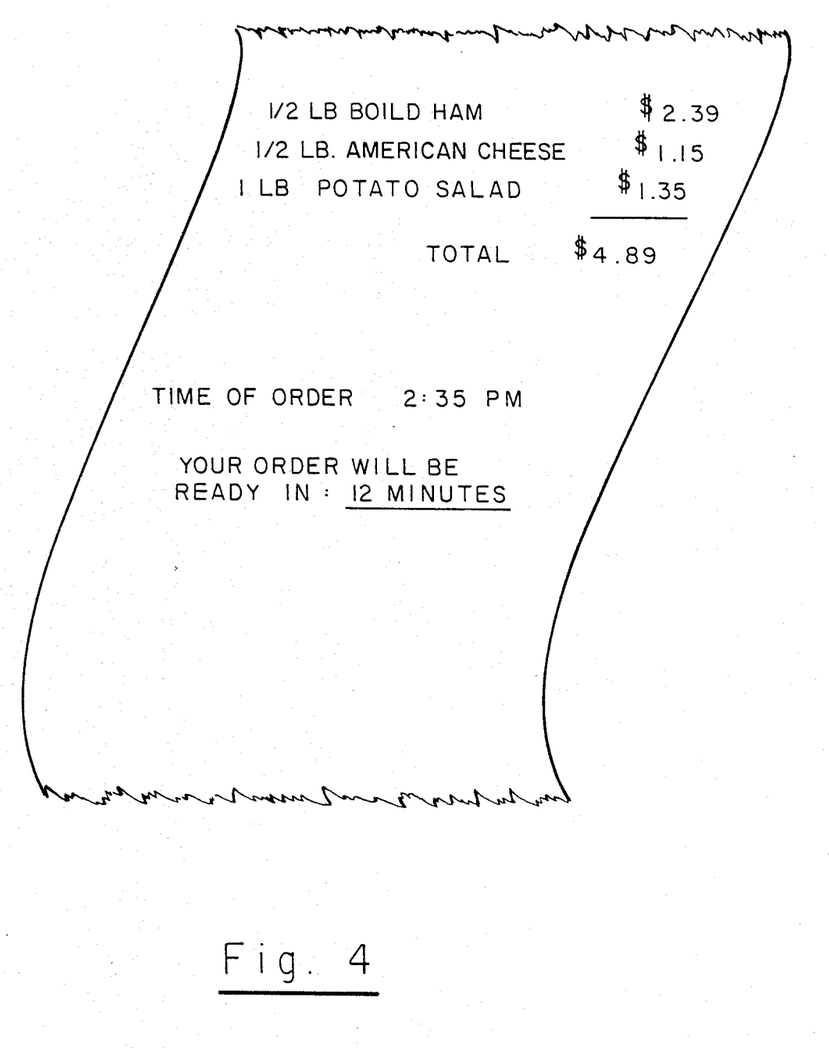
FIG. 4 illustrates an order printout as utilized in the present invention.

Returning to diamond 1021, if the item is in stock, the blocks 1031 and 1032 are entered, these blocks representing the storage of the item selection and the changing of the state of customer terminal i to "Quantity", and the display of a screen which presents the quantity options to the customer (see FIG. 3D). The block 1050 is then entered, this block representing the return of the routine to dispatch control.

Figure 11:
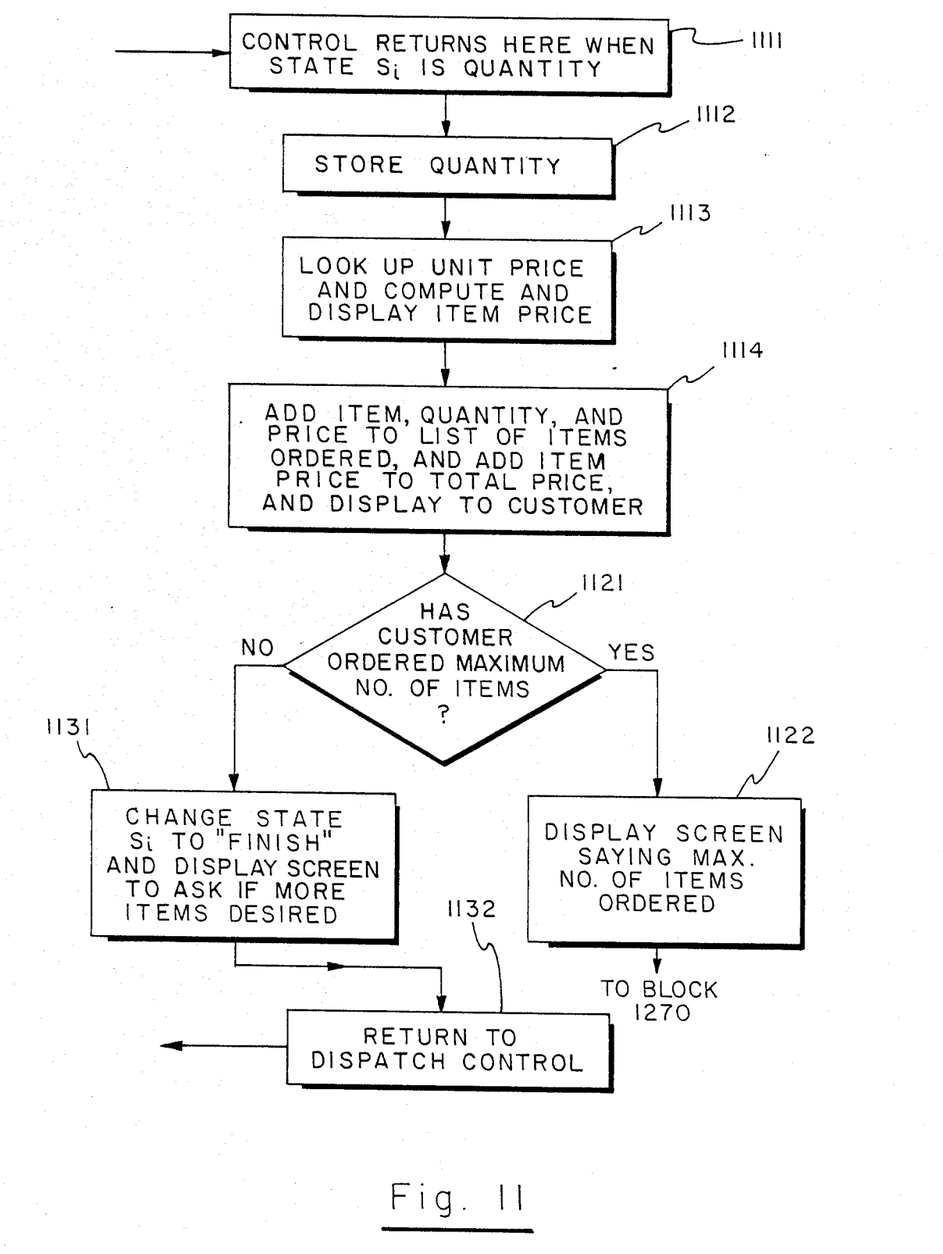

The next portion of the routine is described in conjunction with the flow diagram of FIG. 11. The block 1111 represents the point to which the routine returns when the state $S_i$ of customer terminal i is "Quantity", and customer data has been received. The block 1112 is then entered, this block representing the storage of the selected quantity. The unit price of the item is then obtained from the data base (block 1113), the price for the item is computed by multiplying the quantity by the unit price, and both the unit price and the item price are displayed to the customer (see FIG. 3E). A cumulative total for the order is then computed by adding the item cost to obtain a new total cost (block 1114), and this information is also presented to the customer. Inquiry is then made (diamond 1121) as to whether the customer has ordered the maximum permissible number of items. If so, the block 1122 is entered, and a display screen is presented (not shown) to inform the customer that the maximum number of items have been ordered, whereupon the block 1270 (FIG. 12) is entered directly. If the maximum number of items has not yet been ordered, the block 1131 is entered, this block representing the changing of the state $S_i$ of customer terminal i to "Finish", and the display of a screen to ask the customer if more items are desired (again, see FIG. 3E). The block 1132 is then entered, this block representing the return of the routine to dispatch control.

Figure 3F:
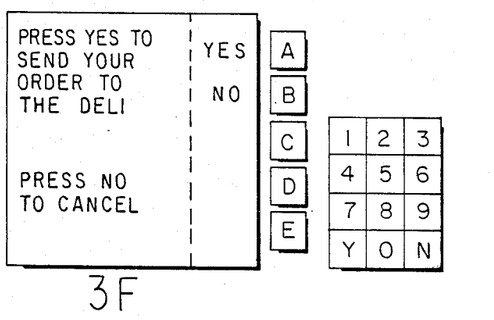
Figure 3G:
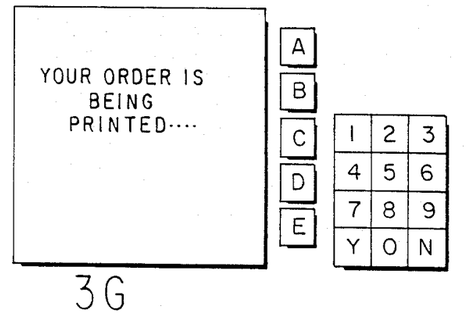
Figure 12:
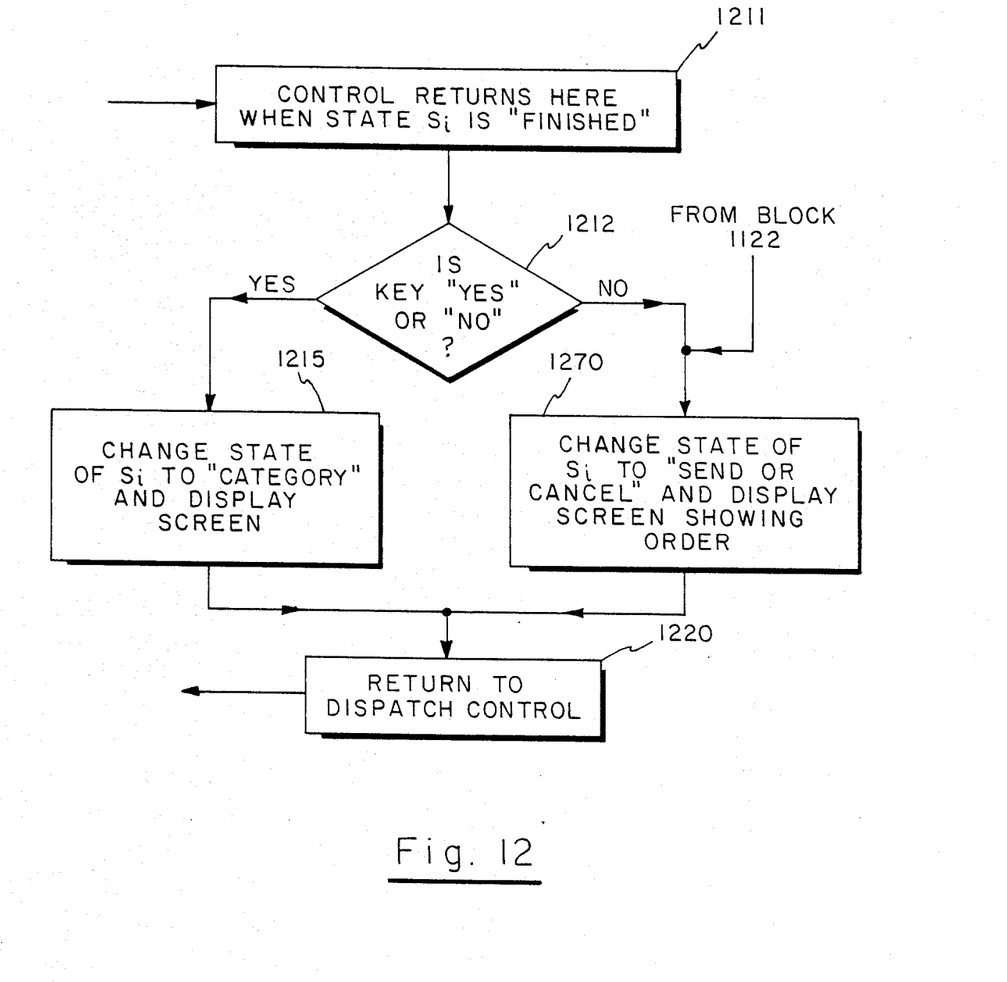

The next portion of the routine is described in conjunction of the flow diagram of FIG. 12. The block 1211 represents the point to which the routine returns when the state $S_i$ of customer terminal i is "Finished", and the customer presses the "yes" or "no" key. The decision diamond 1212 is entered, and determination is made as to whether the "yes" key or the "no" key has been pressed. If it is the "yes" key, the customer has indicated a desire to order more items. The block 1215 is entered, this block representing the change of the state $S_i$ to "Category", and display of the "Category" screen, as shown in FIG. 3B. Return to dispatch control is then implemented, as represented by the block 1220. If the customer has indicated that no further items are to be ordered, the block 1270 is entered, this block also being entered from the output of block 1122, as previously indicated. In this case, the state $S_i$ is changed to "Send Order Or Cancel", and the screen corresponding to this state is displayed, as is shown in FIG. 3F. Return to dispatch control is then implemented, via block 1220.

Figure 13A:
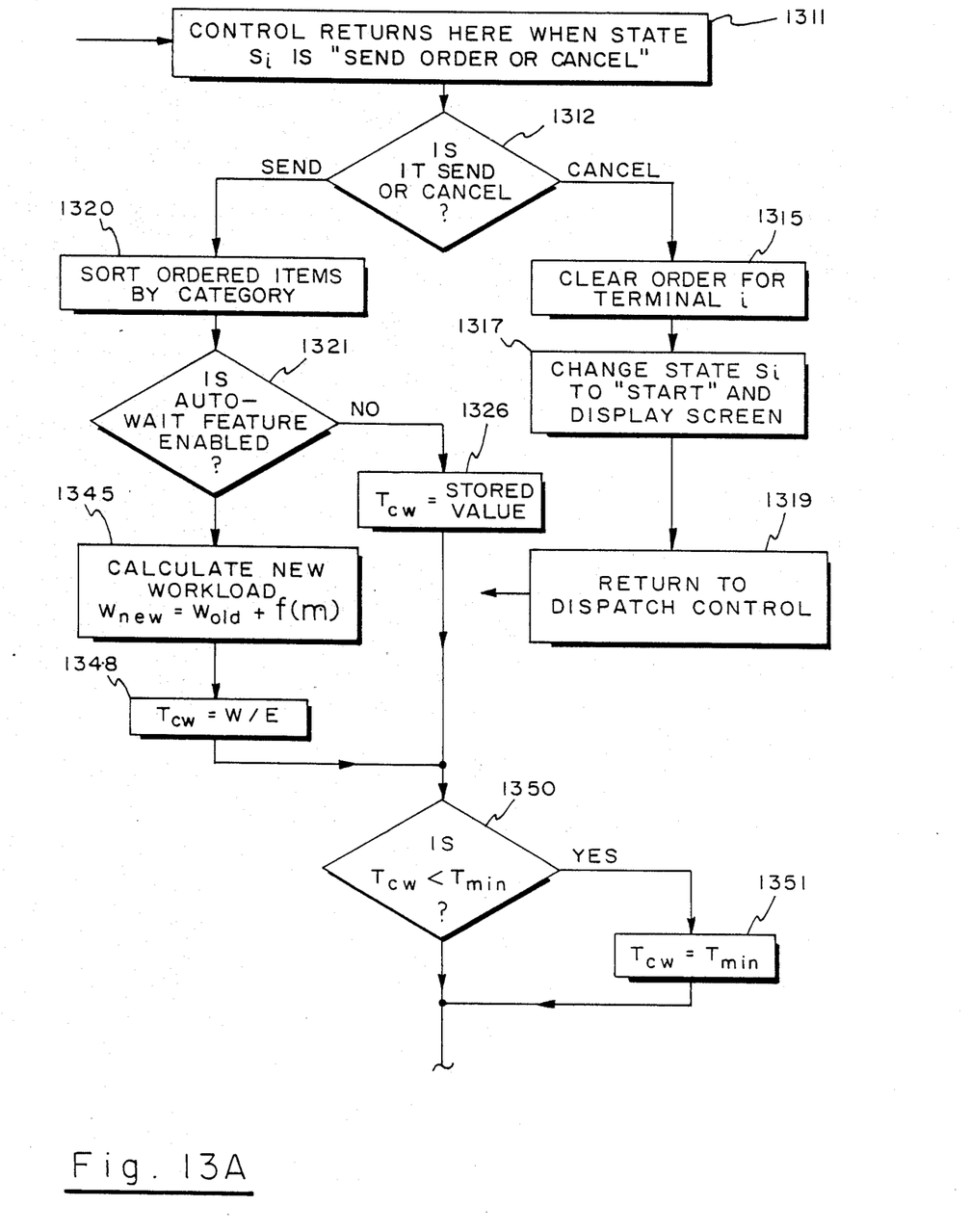
Figure 13B:
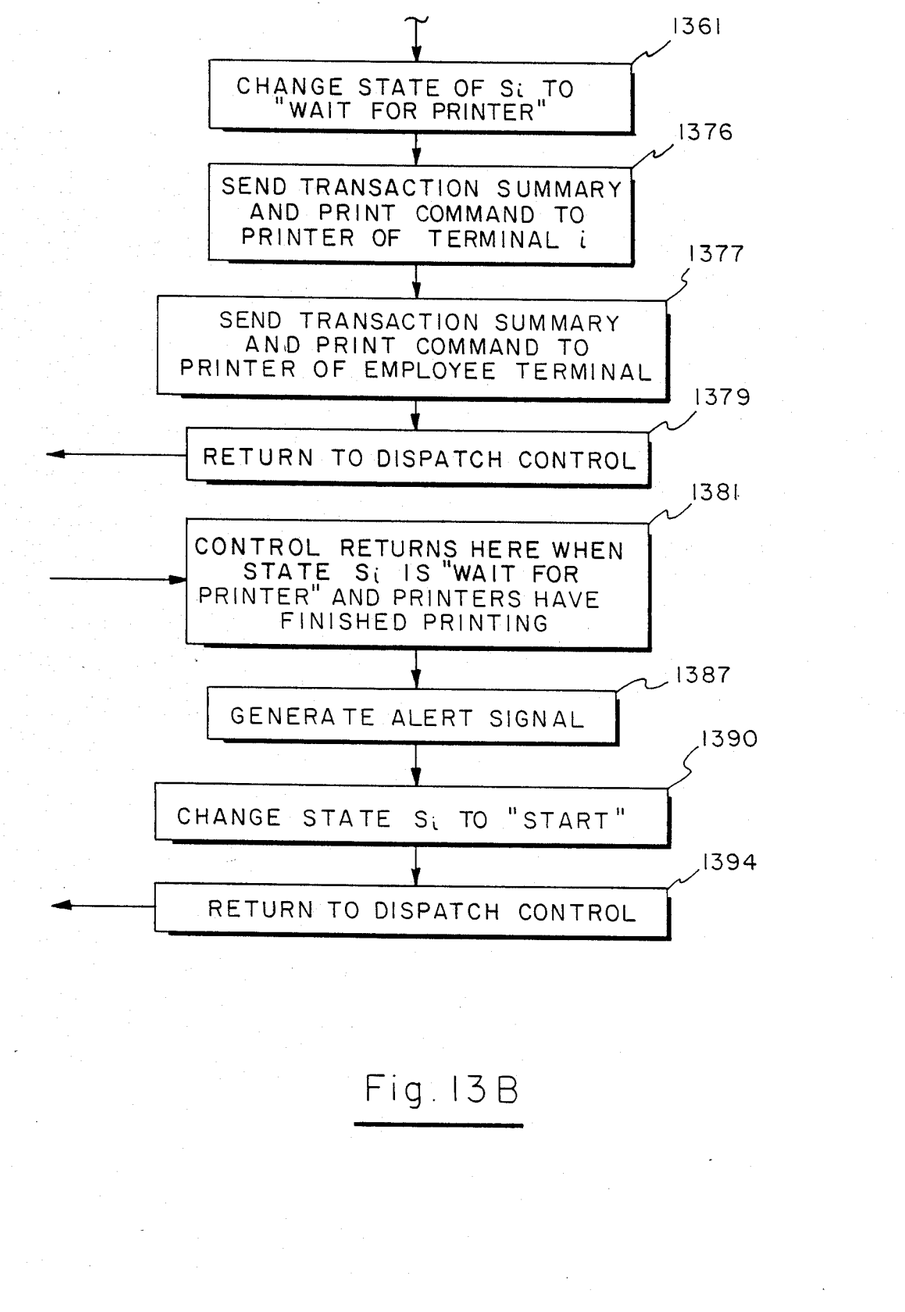

The next portion of the routine is described in conjunction with the flow diagram of FIG. 13. The block 1311 represents the point to which the routine returns when the state $S_i$ of customer terminal i is "Send Order Or Cancel", and the customer has pressed a key to implement the send or cancel. Determination is made (diamond 1312) as to whether the command is "send" or "cancel". If it is "cancel", the stored information for the order is cleared (block 1315), and the state $S_i$ is changed to "Start", and the "Start" screen (i.e., the "hello/advertising" message of FIG. 3A) is displayed (block 1317). Return to dispatch control is then implemented (block 1319). If, however, the customer has pressed the key indicating the desire to send the order to the delicatessen, the block 1320 is entered, this block representing the sorting of items that the customer has ordered by category. This is done for convenience in subsequently printing the order, particularly so that the employee can prepare the items by category, if desired. The diamond 1321 is then entered, and inquiry is made as to whether the automatic waiting time feature is enabled. If not, the block 1326 is entered, this block representing the setting of the customer wait time, $T_{cw}$ to a predetermined stored value. If the automatic wait time feature is not being used, a preferred technique will be to have an employee type in a new stored wait time as he observes the workload at the delicatessen station. The diamond 1350 is then entered, and the customer wait time is tested against a minimum stored wait time (for example, 3 minutes), which is a safety against a smaller wait time being accidentally entered by an employee. If the wait time is less than the prescribed minimum, it is set to the prescribed minimum, as represented by the block 1351.

If the automatic wait time feature is enabled, the block 1345 is entered, this block representing the calculation of the present workload based on the existing workload and the number of items in the present order. A relationship which can be used is:

$$W_{new} = W_{old} + f(m)$$

where m represents the number of items in the order, and f(m) is the function used. One suitable function is to multiply a fixed time by m; for example, 1 minute. This would add 1 minute to the workload for each item in the order. In such case, the new workload (in minutes) would equal the old workload (in minutes) plus m minutes. [It will be recalled, from above, that the one minute timer is utilized to reduce the workload as time passes.] The block 1348 is then entered, this block representing the computation of the new estimated customer waiting time, $T_{cw}$ based on the workload. In the present embodiment, the following relationship is used:

$$T_{cw} = W/E$$

where E is the number of employees working at the delicatessen station. Therefore, if W is considered as being in man-minutes, and E is the number of employees working, then $T_{cw}$ will give the estimated waiting time in minutes. The output of block 1348 is input to diamond 1350 for a test of $T_{cw}$, as previously described.

Continuing with the flow diagram of FIG. 13, the block 1361 represents the changing of the state $S_i$ to "Wait For Printer", and a screen is displayed to the customer (FIG. 3G) indicating that the customer's copy of the order is being printed. Next, the transaction data, i.e., the list of purchased items, and their prices and total, are sent, along with the estimated customer wait time and the time of day, as a print command to the customer terminal printer (block 1376) and the employee terminal printer (block 1377). The block 1379 is then entered, and represents return of the routine to dispatch control.

In the next portion of the routine, the block 1381 represents the point to which the routine returns when the state $S_i$ of customer terminal i is "Wait For Printer", and a signal is received indicating that the printers have finished printing. A typical printout was illustrated above in FIG. 4. The block 1387 is entered, this block representing the generation of an alert signal (e.g. a bell or buzzer) to alert employees that a new order has just arrived. The state, $S_i$, of terminal i is then changed to "Start", and the initial display screen is again displayed, as represented by the block 1390. Then, as represented by the block 1394, return to dispatch control is implemented.

The invention has been described with reference to a particular preferred embodiment, but variations within the spirit and scope of the invention will occur to those skilled in the art. For example, it will be understood that additional terminals can be utilized and, for example, depending upon traffic and equipment usage, it may be desirable to have an additional customer terminal at the supermarket entrance or the delicatessen station, or at a further suitable location in the supermarket. Also, it will be understood that other formulas for computing estimated customer wait time, using factors such as those set forth, as well as other factors, may be devised. Also, it will be understood that other forms of data presentation, storage, and printout can be utilized, consistent with the principles of the invention. Finally, it will be understood that variations in the hardware and/or software can be implemented. For example, a touch screen can be utilized as a customer or employee input device.

We claim:

1. A system for automated shopping order entry for the delicatessen station of a supermarket, comprising:
    a processor subsystem including: means for storing data describing items available for purchase; means for computing and storing an estimated waiting time; means for controlling a sequence for shopping item data presentation for selection by a customer; selection data storage means for storing data representative of a customer's item selections; and means for controlling printing of a customer's item selections and the estimated waiting time;
    a customer subsystem, coupled with said processor subsystem, and including: a display for displaying shopping item data to a customer; customer input means for receiving customer item selection inputs to be stored by said selection data storage means; and customer printing means responsive to said printing controlling means for printing a customer copy of the customer item selections and said waiting time; and
    an employee subsystem, coupled with said processing subsystem, and including employee printing means responsive to said printing controlling means for printing an employee copy of said customer item selections;
    said means for computing and storing an estimated waiting time including means for accumulating a variable workload based on a prior workload, the number of items ordered by customers, the number of employees working on filling orders, and a periodic time decrement, and means for computing and storing said estimated waiting time as a function of said variable workload.

2. The system as defined by claim 1, wherein said employee printing means is also operative to print said waiting time on said employee copy.

3. The system as defined by claim 2, wherein said employee subsystem includes employee input means for controlling said estimated waiting time.

4. The system as defined by claim 3, further comprising at least one further customer subsystem, also coupled with said processor subsystem, and including the same elements as said first-mentioned customer subsystem.

5. The system as defined by claim 1, wherein said employee subsystem includes employee input means for controlling said estimated waiting time.

6. The system as defined by claim 5, wherein said employee input means is also operative to control modification of said stored data describing items available for purchase.

7. The system as defined by claim 1, further comprising at least one further customer subsystem, also coupled with said processor subsystem, and including the same elements as said first-mentioned customer subsystem.

8. The system as defined by claim 1, further comprising means for signaling an employee when a customer order has been entered at the customer subsystem.

* * * * *